June 14, 1955
G. O. YOUNG
2,710,915
ELECTRONIC INTEGRATOR
Filed Dec. 9, 1952
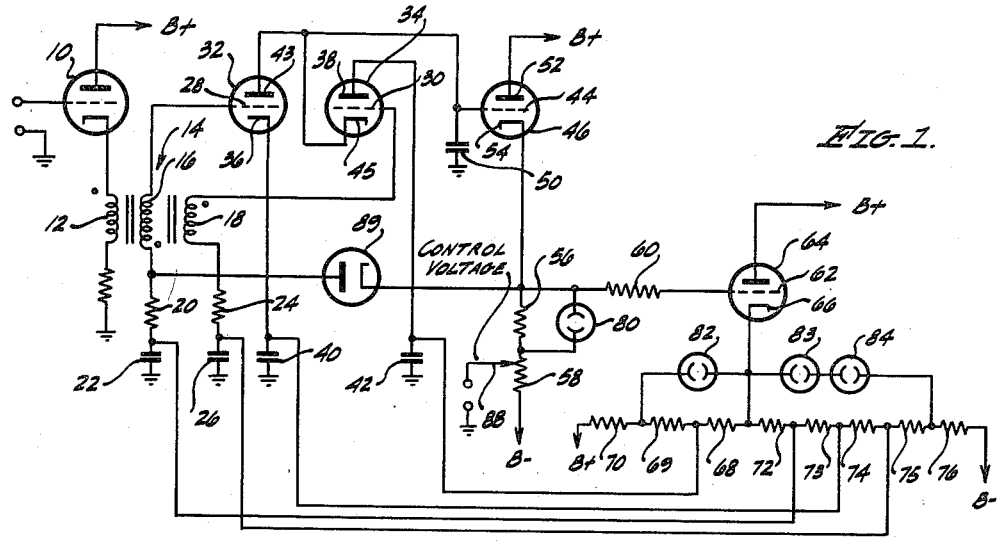
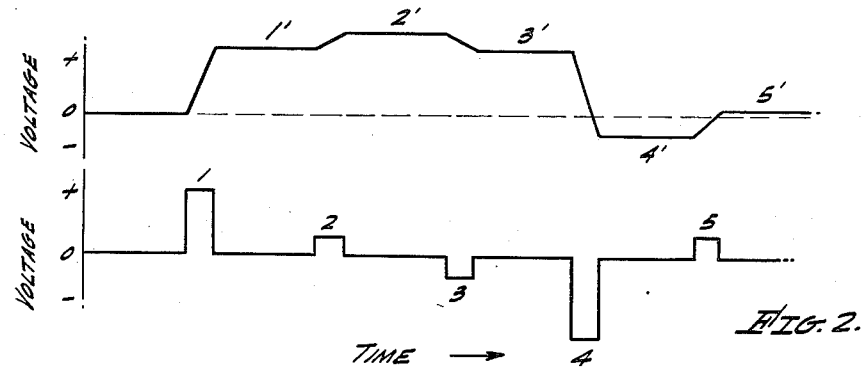
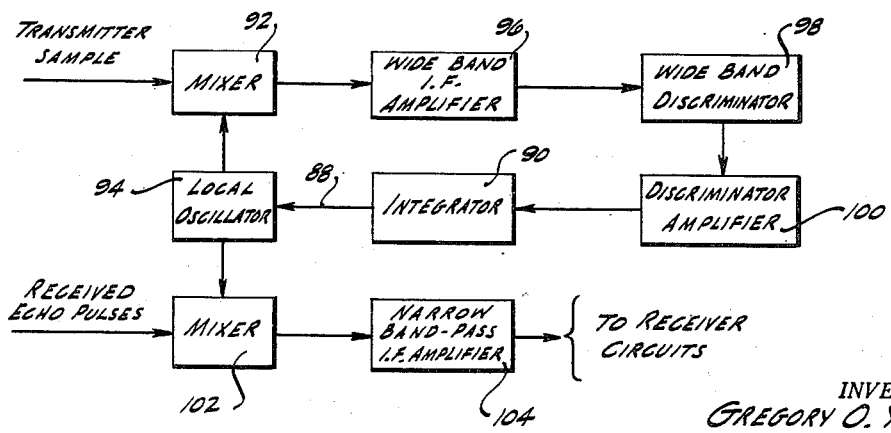
INVENTOR.
GREGORY O. YOUNG,
BY
Nicholas T Vohr
ATTORNEY.

United States Patent Office 2,710,915
Patented June 14, 1955

2,710,915

ELECTRONIC INTEGRATOR

Gregory O. Young, Hawthorne, Calif., assignor, by mesne assignments, to Hughes Aircraft Company, a corporation of Delaware Application December 9, 1952, Serial No. 324,872

6 Claims. (Cl. 250—27)

This invention relates to electronic integrating networks, and more particularly to pulse integrators suitable, for example, for controlling the operation of signal translating circuits.

In many circuit applications, changes in operating conditions must be detected substantially instantaneously, and control signals or voltages must be developed which accurately represent these changes and which may be utilized to control various circuits in response thereto. For example, in UHF (ultra-high-frequency) pulse transmit-receive systems, AFC (automatic frequency control) networks require reliable means for instantaneously detecting changes in the difference frequency between the local oscillator and the transmitted and received signal pulses so as to control the frequency of the local oscillator wave. Many other circuits, such as timing circuits used in computer networks and the like, require rapid and accurate detection of changes in their operating conditions.

The present invention discloses an improved electronic pulse integrating network which performs precise rapid integration of signal pulses applied thereto to establish voltage indications of the magnitudes and polarities of the signal pulses. The pulse integrating network provides a long time-constant memory between pulses, that is, it maintains voltages previously developed substantially constant between successive pulses, whereby pulses representative of changes in operating conditions of a circuit may be applied to such integrating network to derive accurate control voltages that are representative of such changes. In accordance with the present invention, successive signal pulses are applied with opposite polarity to two grid-controlled tubes which are biased so as to be nonconducting in the absence of a pulse. Depending upon the polarity and amplitude of an applied pulse, one or the other of the tubes conducts. For example, if the pulse is positive, an integrating capacitor charges during the occurrence of the pulse to a value corresponding to the amplitude of the pulse. Upon the occurrence of the trailing edge of the pulse, the tubes are again cut off and prevent the charge on the capacitor from leaking off through its tubes. The integrating capacitor is connected to the grid of a cathode follower, from which a signal voltage is obtained that corresponds in amplitude and polarity to the input pulse. Upon the occurrence of the trailing edge of the applied pulse, the grid-cathode impedance of the cathode follower becomes so large as to prevent leakage of the charge on the capacitor therethrough. Similarly, for an applied pulse of negative polarity, the integrating capacitor discharges during the occurrence of the pulse to a value corresponding to the magnitude of the pulse, and causes a corresponding integrated output voltage to be developed from the cathode follower. Where the input signal pulses represent changes in the operating conditions of their source, the integrated output voltages represent control signals which may be used for control purposes in accordance with the changes of the operating conditions.

It is, therefore, an object of this invention to provide an improved electronic pulse integrator which provides precise voltage indications of the amplitude and polarity of pulses applied thereto, and which maintains such indications substantially constant between successive pulses.

It is another object of this invention to provide an improved electronic pulse integrating network having rapid and accurate integrating action during pulses applied thereto, and which has a long time-constant memory.

It is still another object of this invention to provide an accurate pulse integrating network which operates reliably to provide control voltages representative of variations in polarity and magnitude of successive signal pulses of short duration applied thereto, and to maintain the respective control signals substantially constant between pulses.

The novel features which are believed to be characteristic of the invention, both as to its organization and method of operation, together with further objects and advantages thereof, will be better understood from the following description considered in connection with the accompanying drawings, and the scope of the invention is pointed out in the appended claims. In the drawings:

Fig. 1 is a schematic circuit diagram illustrating a rapid-acting, long time-constant memory electronic pulse integrator, in accordance with this invention;

Fig. 2 shows waveforms illustrating the action of the integrator of Fig. 1 in response to signal pulses of varying magnitude and polarity; and Fig. 3 is a schematic block diagram of a system employing the electronic pulse integrator shown in Fig. 1.

Referring to Fig. 1, an electron amplifier tube 10, which is shown by way of example as a triode connected as a cathode follower having a grid circuit to which input signal pulses may be applied, is provided with an inductor 12 in the cathode circuit thereof that constitutes the primary winding of a transformer 14. The transformer 14 has two separate secondary windings 16, 18 each coupled at one end to a point of reference or ground potential through respective series RC (resistor-capacitor) networks 20, 22 and 24, 26, and each connected at their opposite ends to the control grids 28, 30, respectively, of a pair of electron tubes 32, 34, which, for example, may be triodes as shown. Secondary windings 16, 18 are wound and are connected with opposite polarity with respect to each other to control grids 28, 30. The cathode 36 of triode 32 and the anode 38 of triode 34 are coupled to ground by respective capacitors 40 and 42. The anode 43 of one triode 32 is connected directly to the cathode 45 of the other triode 34, and their junction is directly connected to the grid 44 of a triode 46 connected as a cathode follower.

Tubes 32 and 34 are both negatively biassed and are rendered conducting only upon the impression of positive pulses of sufficient amplitude on their grids. Tube 34 assists in the accumulation of a positive voltage corresponding to input positive pulses and tube 32 effects a subtraction upon the impression of input negative pulses. To this end, winding 16 is connected to grid 28 so that negative incoming pulses are applied with positive polarity to grid 28, and winding 18 impresses positive incoming pulses with positive polarity on grid 30 of tube 34.

The cathode follower 46, which preferably is a substantially unity gain amplifier of a well-known type, has its anode 52 connected directly to the positive terminal B+ of a voltage supply source, and its cathode 54 coupled through a pair of serially connected resistors 56, 58 to the negative terminal B— of such source.

The purpose of this invention is to effect linear charging or discharging of the integrating capacitor 50 to successive voltage levels in accordance with the polarity and magnitude of successive signal pulses applied to the amplifier tube 10, and to maintain the voltage level changes provided by integrating capacitor 50 at the trailing edge of each pulse substantially constant until a succeeding pulse is applied to amplifier tube 10.

As will become more evident hereinafter, the operating bias on triodes 32, 34 must change from pulse to pulse to a value corresponding to the charge built up across integrating capacitor 50 during a pulse and maintained until the arrival of the succeeding pulse. Such "floating" of the operating biases permits the potentials provided by the integrating capacitor to follow accurately the changes in magnitude and polarity of the input pulses applied to amplifier tube 10.

It will be observed that the above-described procedure for charging and discharging integrating capacitor 50 is in contrast to prior art integrating circuits which effect charging or discharging of an integrating capacitor always from a fixed reference voltage level during a pulse and discharging or charging of such capacitor back to the fixed reference voltage level upon occurrence of the trailing edge of the pulse. In such prior art circuits, of course, the tubes employed are supplied with a fixed operating bias, inasmuch as the potential built up across the integrating capacitor is returned to a fixed reference level between pulses. However, as is well known, considerable demands are placed upon circuits employed for obtaining rapid integration during the application of signal pulses thereto, and accurate integration is difficult to obtain particularly for high pulse repetition rates.

Furthermore, a long time-constant memory is very difficult to obtain with such prior art circuits. As will be made more obvious hereafter, the circuit of the present invention is not subject to these disadvantages, and permits rapid and accurate integration during a signal pulse, that is, a short time-constant charging period for integrating capacitor 50, as well as the retention of potentials obtained during the integrating action until the arrival of a succeeding pulse, that is, a relatively long time-constant memory.

To obtain the desired floating operating voltages for triodes 32, 34, the cathode 54 of cathode follower 46 is resistively coupled, as by a resistor 60, to the grid 62 of another cathode follower 64, the cathode 66 of which is connected to the junction of two serially connected resistor networks respectively comprising serially connected resistors 68, 69, 70 and serially connected resistors 72, 73, 74, 75, 76. The terminals of the two resistor networks, comprising, respectively, one end of resistor 70 and one end of resistor 76, are connected to the respective positive and negative terminals B+ and B— of the voltage source previously mentioned. The junction of resistors 68, 69 is connected to the anode 38 of triode 34, and the junction of resistors 73, 74 is connected to the cathode 36 of triode 32, thereby to provide a plate supply voltage and a conventional direct-current path for triodes 32, 34. Also, feedback connections are provided respectively between the junction of resistors 74, 75 and the junction of series RC network 24, 26 and between the junction of resistors 72, 73 and the junction of series RC network 20, 22, thereby to supply bias voltages to control triodes 30 and 28, respectively. The above-described connections function to provide initial operating voltages for triodes 32, 34.

Sensitive voltage responsive means are employed for effecting changes in operating voltages applied to tubes 32, 34 in response to changes in potentials which appear at the cathode 54 of cathode follower 46 in response to charging and discharging of integrating capacitor 50. One such voltage responsive means comprises a neon or glow discharge tube 80 connected in shunt with resistor 56, a neon tube 82 connected in parallel with resistors 68 and 69, and series connected neon tubes 83 and 84 connected across resistors 72, 73, 74, and 75. As connected, neon tube 80 is provided with an initial starting voltage by the voltage drop that is developed across resistor 56 when the circuit is first energized; thereafter, neon tube 80 functions in a well-known manner as a variable resistance device to permit voltage changes appearing on cathode 54 to appear unchanged at the junction of resistors 58, 56.

Neon tube 82 and series connected neon tubes 83, 84 function in the same manner as neon tube 80 to permit voltage changes at the cathode 66 of cathode follower 64 to appear at the junctions of resistors 69, 70 and resistors 75, 76. Accordingly, voltages developed across the resistor networks shunted by the neon tubes 82 and 83, 84 as above described will vary in step with the voltage changes at the cathode 66. Therefore, the operating voltages supplied to the triodes 32, 34 in the manner above described will vary in step with the charging and discharging of integrating capacitor 50.

The operation of the circuit above described will now be explained with reference to Figs. 1 and 2:

Assume a positive signal pulse 1 (Fig. 2) is applied initially to the control grid circuit amplifier tube 10. By virtue of the winding of the secondary windings 16, 18 of the transformer 14, as previously described, the cut-off bias of one triode 34 is overcome and the tube conducts, while the bias on the other triode 32 is driven farther beyond cutoff. The integrating capacitor 50, which has a small capacitance and an exceedingly small charging time constant, is charged through triode 34 which is now conducting. Capacitor 50 charges from an initial voltage level such as zero throughout the duration of the pulse to a voltage level 1' corresponding to the amplitude of pulse 1; by virtue of the conventional action of the cathode follower 46, a voltage corresponding to the charge on the integrating capacitor 50 will be developed across the resistor 58, from which a control or output voltage lead 88 may be connected for utilizing such voltage as desired.

At the occurrence of the trailing edge of signal pulse 1, both triodes 32, 34 are again nonconducting. By virtue of the high impedance presented by nonconducting triodes 32, 34 and the relatively high impedance between grid 44 and cathode 54 caused by the cathode follower 46 being provided with sufficient negative bias, the charge on integrating capacitor 50, and hence the voltage change applied to resistor 58 remains substantially constant for a relatively long period of time; that is, a relatively long time-constant network is provided by capacitor 50 and nonconducting triodes 32, 34 and the negatively biassed grid of 46. The voltage "memory" of the circuit of this invention may be as long as one hundred microseconds, that is, substantially no leakage of the charge on the integrating capacitor 50 occurs for at least 100 microseconds. All that is necessary in the circuit of the present invention is that succeeding pulses occur before the time-constant memory period ends.

During signal pulse 1, the voltages across the series connected resistors 68, 69 and 72, 73, 74, and 75 increases proportionately as the voltage change across resistor 58, whereupon the bias voltages applied to the various elements of triodes 32, 34 through the respective connections previously described will be raised correspondingly, thereby to set the operating points of triodes 32, 34 at voltage levels corresponding to the charge on integrating capacitor 50.

For a succeeding signal pulse 2 applied to amplifier tube 10, and which is also of positive polarity but of smaller magnitude than preceding signal pulse 1, triode 34 will again conduct and integrating capacitor 50 will further charge to a higher voltage level 2' corresponding to the magnitude of signal pulse 2. As in the case of preceding signal pulse 1, the operating points of triodes 32, 34 are raised simultaneously with the charge on integrating capacitor 50 to correspond to voltage level 2'.

For a succeeding signal pulse 3 applied to amplifier tube 10, which is of negative polarity, triode 32 will conduct, whereupon integrating capacitor 50 discharges through triode 32 to a voltage level 3' during signal pulse 3. At the trailing edge of signal pulse 3, triode 32 is again rendered nonconducting and, in the manner previously described, bias voltages applied to the elements of triodes 32, 34 will decrease to establish operating points for the triodes which correspond to voltage level 3'.

Similarly, the operation of the circuit above described in connection with signal pulses 1, 2, and 3 applied to amplifier tube 10 will be the same for further succeeding pulses, such as a negative signal pulse 4, and a positive signal pulse 5, to effect respective discharging and charging of the integrating capacitor 50 to voltage levels 4' and 5', and to change the bias voltages of triodes 32, 34 to voltages corresponding to voltage levels 4' and 5', respectively.

Referring to Fig. 3, an electronic pulse integrator 90 of the type described in connection with Fig. 1 is employed in a transmitter-sample type difference-frequency AFC loop or circuit of an U. H. F. transmit-receive system of the type wherein echoes of transmitted signal pulses are applied to suitable receiving circuits for determining the location of an object. Such an AFC loop is described in a copending application of G. O. Young entitled "Automatic Frequency Control," filed concurrently herewith and assigned to the same assignee as is the present application.

Transmitter sample pulses are applied to a mixer 92 along with a portion of the output of the local klystron oscillator 94 of the receiver circuit of the system. A wide-band I. F. (intermediate-frequency) amplifier 96 is coupled to mixer 92 for amplifying signals whose frequency may deviate considerably from the desired center or intermediate frequency.

Because a wide-band I. F. amplifier develops signals having relatively little gain, a discriminator 98, which preferably operates over a correspondingly wide band, is employed to develop signal pulses whose amplitude and polarity correspond to the deviation of the signals from the desired center frequency of I. F. amplifier 96, which are amplified by an amplifier 100 to provide the desired gain. The integrator 90 is adapted to receive the signal pulses from amplifier 100, which may represent the amplifier tube 10 of Fig. 1.

When the output of the mixer 92 deviates from the desired center frequency, the integrator 90 operates in the manner previously described to develop a control voltage which may be applied by control voltage lead 88 to the local klystron oscillator 94 in the conventional manner to change the frequency of operation thereof to the extent required to provide signals from the mixer 92 of the desired center or intermediate frequency. In this manner, the difference frequency between the transmitted pulses and the output wave of the local oscillator 94 is maintained substantially constant. Consequently, the output of a receiver mixer 102, which mixes received echo signal pulses with a portion of the output of local oscillator 94, will be maintained substantially constant, thus permitting the use of a relatively narrow-band, high-gain I. F. amplifier 104 for feeding signals to receiver circuits coupled thereto.

An exemplary AFC loop of the type above described may employ a 10 mc. (megacycle) bandwidth I. F. amplifier 96 coupled to a discriminator 98 that operates over a 10 mc. range for supplying signal pulses to integrator 99 immediately upon the occurrence of changes in the desired difference frequency. A wide-band discriminator suitable for such use is described and claimed in a copending application of G. O. Young et al., entitled, "Frequency Discriminator," Serial No. 324,874, filed concurrently herewith and assigned to the same assignee as is the present application.

In a typical AFC loop for a U. H. F. pulse transmit-receive system of the type above described, which has a difference frequency of 15 m. c. and utilizes signal pulses of five microseconds duration, precise control voltages have been provided for a frequency deviation of the desired difference frequency as great as eight megacycles during a single pulse. Furthermore, such control voltages remain substantially constant for over 100 microseconds until the echo signal pulse was received. Such accuracy was found sufficient to permit the use of a receiver I. F. amplifier having a bandwidth of only 120 kc. (kilocycles).

From the foregoing explanation, it is clear that there has been described a reliable pulse integrating network which provides rapid integration during the application of successive signal pulses to such network, which employs grid-controlled tube means coupled to an integrating capacitor and being operative to establish a low resistance path during the application of signal pulses to such network for providing a short time-constant network, and being operative to establish a high impedance path between pulses for providing a long time-constant network, thereby to provide a rapid-acting integrator having a long "memory."

What is claimed is:

1. An electronic integrating network comprising, in combination, a pair of grid-controlled electron tubes each having a predetermined operating bias; means coupled to said tubes for applying simultaneously to the respective tubes individual signal pulses of substantially like amplitudes and opposite polarities; said predetermined operating biases being such that each of said tubes is rendered conducting only for signal pulses applied thereto of positive polarity; integrating capacitive means coupled to said tubes, said tubes being operative to charge or discharge said capacitive means substantially linearly from a predetermined voltage level upon the application of a positive signal pulse to one of said tubes to a succeeding voltage level corresponding to the magnitude of the pulse; means coupled to said capacitive means and to said tubes for changing the operating bias for each tube in response to changing in the aforementioned voltage levels; and said last-named means and said tubes being effective upon the occurrence of the trailing edge of said signal pulse, and before the application to said tubes of a succeeding signal pulse, to substantially prevent leakage of the charge across said capacitor, whereby said capacitor during said succeeding signal pulse will be charged or discharged substantially linearly to a new voltage level representative of the polarity and magnitude thereof, from said succeeding voltage level.

2. The integrating network defined in claim 1, in which said means for applying signal pulses to said tubes comprises a transformer having a primary winding to which input signal pulses may be applied, and two secondary windings coupled to grid control circuits of said tubes for applying said signal pulses to said grid control circuits in opposite polarities.

3. The integrating network defined in claim 1, in which said means for changing said operating biases and for substantially preventing leakage comprises a grid-controlled cathode follower electron discharge device providing high grid-cathode impedance between successive signal pulses, and resistive means coupled to said device for deriving voltages thereacross which vary with the change in voltage level across said capacitive means.

4. The integrating network defined in claim 3, in which said bias changing means further comprises a direct-current voltage supply source coupled to said cathode follower device and to said resistive means for supplying bias control voltages to said tubes which vary with the changes in said voltage levels.

5. An electronic pulse integrator comprising, in combination, a pair of electron tubes each having an anode, a cathode and a control grid, the anode of one of said tubes being connected directly to the cathode of the other tube, an integrating capacitor connected between the anode of said one of said tubes and a point of reference potential, means for normally biasing said tubes to be nonconducting, means for applying a signal pulse to the control grid of one of said tubes to effect conduction thereof, said capacitor during the application of said signal pulse to said one of said tubes being charged to a potential corresponding to the amplitude and polarity of said pulse, cathode follower means coupled to said capacitor for deriving a control output voltage corresponding to the charge across said capacitor, and said tubes and cathode follower means substantially preventing leakage of the charge across said capacitor at the occurrence of the trailing edge of said pulse, thereby to maintain the voltage developed by said capacitor substantially constant until a succeeding signal pulse is applied to said tubes.

6. An electronic pulse integrator network comprising a capacitor and a pair of electrode controlled electron discharge devices, said discharge devices being coupled to said capacitor, bias voltage means connected to the control electrode of each discharge device for providing a predetermined initial bias thereon, means responsive to positive input signal pulses to impress a positive voltage pulse on the control electrode of one discharge device, means responsive to negative input pulses to impress a positive voltage pulse on the control electrode of the other discharge device, the respective discharge devices being made conductive only when the voltage pulses applied to said control electrodes are positive, said one discharge device and said other discharge device respectively causing said capacitor to charge and discharge an amount representative of the magnitudes and positive and negative polarities, respectively, of said signal pulses, and bias changing means coupled to said capacitor and to said tubes and operable during the pulses to change the bias potential for each control electrode in the same sense and to a value corresponding to the change in charge across said capacitor and to substantially prevent leakage of the charge across said capacitor thereby to maintain the voltage changes across said capacitor substantially constant between successive signal pulses.

References Cited in the file of this patent

UNITED STATES PATENTS

| | | |
|---|---|---|
| 2,458,599 | Hussey | Jan. 11, 1949 |
| 2,549,022 | Shenk et al. | Apr. 15, 1951 |